United States Patent
Masselle et al.

(10) Patent No.: US 9,251,128 B2
(45) Date of Patent: Feb. 2, 2016

(54) REPLACING A DESIGNATED CHARACTER STRING, OR STYLING WITHIN THE DESIGNATED SCOPE OF TAGGED EDITED CONTENT IN A DOCUMENT

(75) Inventors: Eric Leonard Masselle, Raleigh, NC (US); Velda Bartek, Apex, NC (US); Patrick Gabriel McGowan, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 13/488,867

(22) Filed: Jun. 5, 2012

(65) Prior Publication Data
US 2013/0326344 A1    Dec. 5, 2013

(51) Int. Cl.
G06F 17/21    (2006.01)
G06F 17/24    (2006.01)
G06F 17/22    (2006.01)

(52) U.S. Cl.
CPC ........... G06F 17/24 (2013.01); G06F 17/21 (2013.01); *G06F 17/218* (2013.01); *G06F 17/2288* (2013.01); *G06F 17/241* (2013.01)

(58) Field of Classification Search
CPC ........ G06F 17/21; G06F 17/218; G06F 17/24
USPC .................................................. 715/255, 256
See application file for complete search history.

(56) References Cited

U.S. PATENT DOCUMENTS

| | | | |
|---|---|---|---|
| 6,006,239 A * | 12/1999 | Bhansali et al. ........................ 1/1 |
| 6,442,576 B1 * | 8/2002 | Edelman et al. ............... 715/234 |
| 7,472,114 B1 * | 12/2008 | Rowney et al. ........................ 1/1 |
| 7,949,633 B1 * | 5/2011 | Shaver et al. ................. 707/620 |
| 2002/0124115 A1 * | 9/2002 | McLean et al. ............... 709/310 |
| 2002/0129053 A1 | 9/2002 | Chan et al. |
| 2004/0205653 A1 * | 10/2004 | Hadfield et al. ............... 715/530 |
| 2005/0240572 A1 * | 10/2005 | Sung et al. ........................ 707/3 |
| 2007/0239674 A1 | 10/2007 | Gorzela |
| 2008/0228671 A1 * | 9/2008 | Nagaraj ........................ 705/500 |
| 2009/0182723 A1 | 7/2009 | Shnitko et al. |
| 2009/0259662 A1 * | 10/2009 | Cragun et al. .................... 707/9 |

(Continued)

FOREIGN PATENT DOCUMENTS

WO        2007071482  A2      6/2007

OTHER PUBLICATIONS

IDM Computer Solutions, Inc., Find and Replace | UltraEdit, Jan. 6, 2012, https://web.archive.org/web/20120106024252/http://www.ultraedit.com/support/tutorials_power_tips/ultraedit/find_replace.html.*

*Primary Examiner* — Cesar Paula
*Assistant Examiner* — Yahao Chen
(74) *Attorney, Agent, or Firm* — Moore & Van Allen PLLC

(57) ABSTRACT

A method, system and computer program product for providing scoping editing operations in a document using a document editing computer application. The method, program system, and computer product may include tagging each incidence of editing with the identity of the author responsible for the applicable incidence, the date, the date and time, document phase, author role, or any combination thereof. The method, program system, and computer product may further include presenting a mechanism for designating a scope of tagged content by author, date, date and time of day, document phase, author role, or a combination thereof, and locating a selection of at least some of the tagged content according to the designated scope of the tagged content.

17 Claims, 4 Drawing Sheets

(56) References Cited

U.S. PATENT DOCUMENTS

| | | |
|---|---|---|
| 2009/0300487 A1 | 12/2009 | Hazlewood et al. |
| 2009/0319910 A1 | 12/2009 | Escapa et al. |
| 2010/0083136 A1 | 4/2010 | Komine et al. |
| 2010/0125450 A1* | 5/2010 | Michaelangelo et al. ........ 704/9 |
| 2010/0281426 A1* | 11/2010 | Schmidt ........................ 715/810 |
| 2011/0078562 A1* | 3/2011 | Hoffmann .................... 715/256 |
| 2011/0179073 A1 | 7/2011 | Nilsson |
| 2011/0276920 A1* | 11/2011 | Fong et al. .................... 715/810 |
| 2011/0295720 A1* | 12/2011 | Parikh et al. ................. 705/27.1 |
| 2012/0110445 A1* | 5/2012 | Greenspan et al. ........... 715/256 |
| 2012/0272192 A1* | 10/2012 | Grossman et al. ............ 715/854 |
| 2012/0317479 A1* | 12/2012 | Safa .............................. 715/256 |
| 2013/0218845 A1* | 8/2013 | Kleppner et al. ............. 707/687 |
| 2013/0326323 A1* | 12/2013 | Siwoff et al. ................. 715/229 |

* cited by examiner

REPLACING A DESIGNATED CHARACTER STRING, OR STYLING WITHIN THE DESIGNATED SCOPE OF TAGGED EDITED CONTENT IN A DOCUMENT

BACKGROUND

Aspects of the present invention relate to document creation and editing applications or software programs operable on a computer system, and more particularly to a method, system and computer program product for scoping of operations in a document editing context.

Computer applications or software for use in creating and editing text documents are ubiquitous, and frequently include find and replace functionality in which a search for a string of characters is performed. When found, that string is replaced with another string of characters. Such traditional editing applications include Microsoft Word, Lotus Symphony, and OpenOffice. Microsoft and Word are trademarks of the Microsoft Corporation in the United States, other countries or both. Lotus Symphony is a trademark of the IBM Corporation in the United States, other countries or both. OpenOffice is a trademark of the Apache Software Foundation in the United States, other countries, or both.

Applications or software that permit concurrent or independent access and editing by more than one user, which may be referred to as collaborative or simultaneous editing, are becoming increasingly prevalent. IBM Docs and Google Docs are examples of collaborative editing software applications. IBM and IBM Docs are trademarks of the IBM Corporation in the United States, other countries or both. Google and Google Docs are trademarks of Google Inc in the United States, other countries or both. Such collaborative editing applications present an advantage generally unavailable in traditional document editing applications, in which multiple versions of documents may, by necessity, be created between users—there need only be one document to be edited in a collaborative editing application.

Accordingly, multiple authors can collaborate on a document in at least two ways: (1) by alternating editing sessions consisting of a single author, or (2) simultaneous editing by multiple authors within a single editing session. "Find" and "find and replace" functionality behaves in conventional collaborative editing as previously established in traditional editors. In neither type of editor is there a feature or method providing a more discretionary find or find and replace operation, specifically, one that is selective as to target content based on which user created the content or other criteria associated with edited content.

BRIEF SUMMARY

According to one aspect of the present invention, a method is provided for scoping editing operations in a document using a document editing computer application. The method may include tagging each incidence of edited content of the document with at least one of the identity of an author responsible for the applicable incidence, the date of the incidence, the date and time of day of the incidence, document phase, author role, or any combination thereof. The method may further include presenting a mechanism for designating a scope of tagged content by at least one of author, date, date and time of day, document phase, author role, or any combination thereof and locating a selection of at least some of the tagged content according to the designated scope of the tagged content.

According to another aspect of the present invention, a system for providing scoping of editing operations in a document using a document editing computer application may include a processor. The system may also include a module operating on the processor for providing scoping of editing operations in a document using a document editing computer application. The module may include a module for tagging each incidence of edited content of the document with at least one of the identity of an author responsible for the applicable incidence, the date of the incidence, the date and time of day of the incidence, document phase, author role, or any combination thereof. The module may also include a module for presenting a mechanism for designating a scope of tagged content by at least one of author, date, date and time of day, document phase, author role, or any combination thereof, and a module for locating a selection of at least some of the tagged content according to the designated scope of the tagged content.

According to a further aspect of the present invention, a computer program product for providing scoping of editing operations in a document using a document editing computer application may include a computer readable storage medium having computer readable program code embodied therewith. The computer readable program code may include computer readable program code configured to tag each incidence of editing with at least one of the identity of an author responsible for the applicable incidence, the date of the incidence, the date and time of day of the incidence, document phase, author role, or any combination thereof. The computer readable program code may also include computer readable program code configured to present a mechanism for designating a scope of tagged content by at least one of author, date, date and time of day, document phase, author role, or any combination thereof, and computer readable program code configured to locate a selection of at least some of the tagged content for editing the document according to the designated scope of the tagged content.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
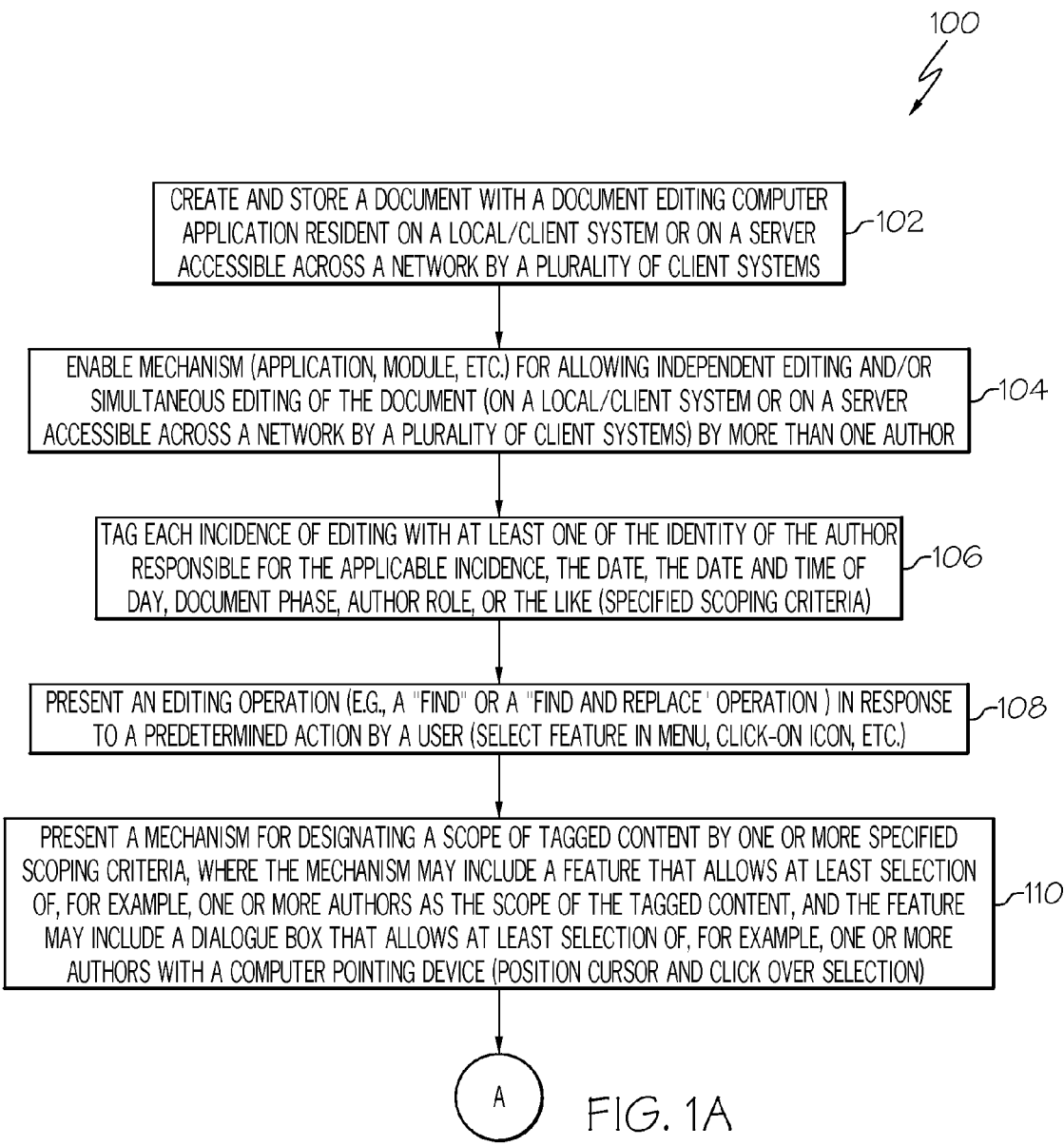
FIGS. 1A and 1B are a flowchart of an example of a method 100 for providing scoping in a document editing computer application in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
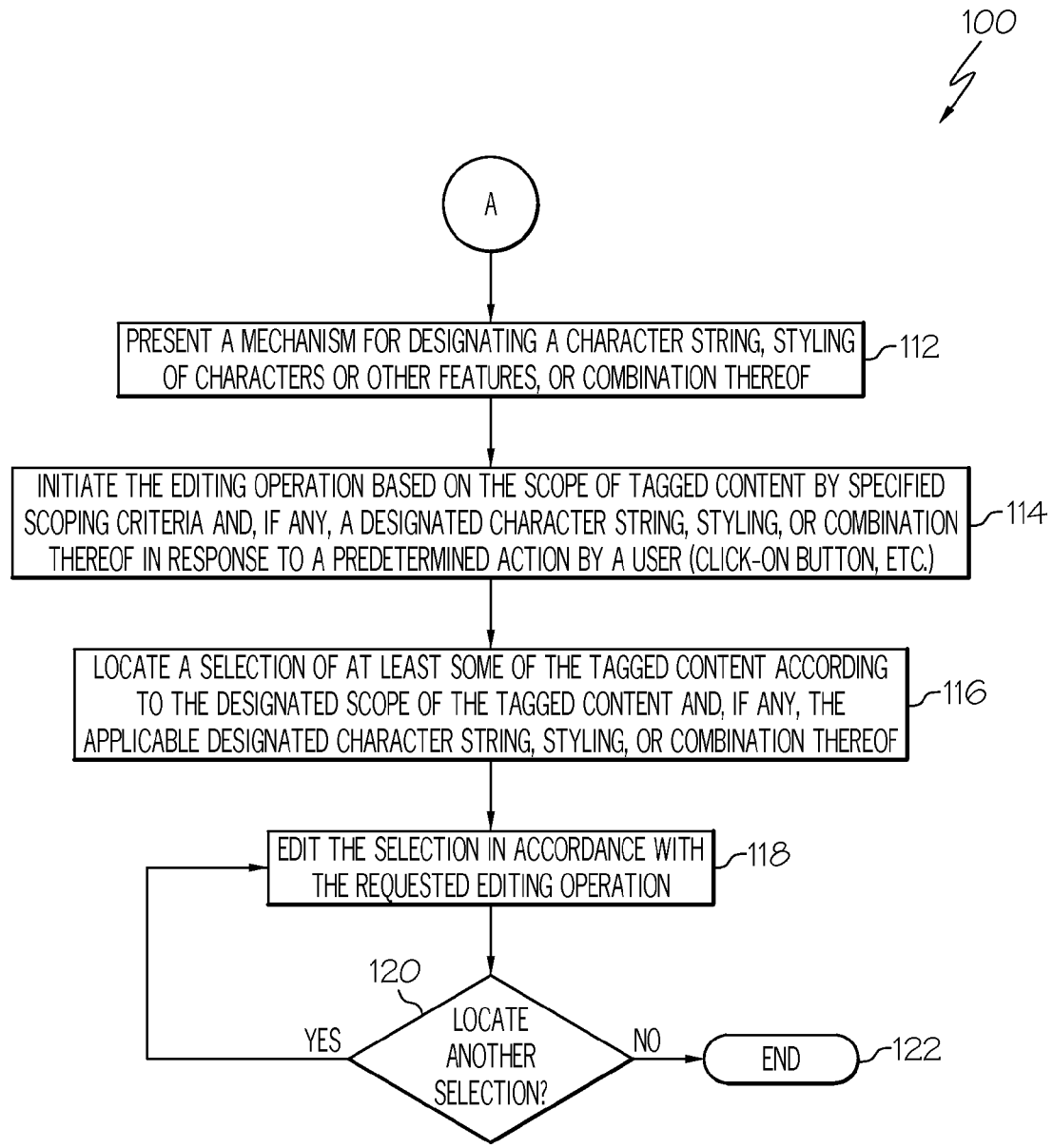

FIGS. 1A and 1B are a flowchart of an example of a method 100 for providing scoping in a document editing application in accordance with an embodiment of the present invention. Such a document editing application may allow independent editing by one author at a time, collaborative editing by more than one author simultaneously, or both. In block 102 on FIG. 1A, a document, in a document file, is created and stored with a document editing computer application that may be resident on a local user's system, which may be a client system, or on a server accessible by a plurality of client systems across a network. The document may include at least characters, styling of characters or other features, or both.

In block 104, a mechanism for allowing independent editing of the document by one author at a time, simultaneous editing of the document by more than one author, or both, may be enabled on a local, client system, or on the server accessible by a plurality of client systems across a network. The mechanism may be an application or module that may be part of the document editing application or software program or may be a separate application or module operable in conjunction with the document editing application on a computer or computing device.

In block 106, when a user enters edits to the documents, therefore being an author, each incidence of editing is tagged with at least one of the identity of the author responsible for the applicable incidence of editing, the date, the date and time of day, document phase, author role, or similar information corresponding to the entry to the edited content, all of which may be referred to individually or collectively as "specified scoping criteria." "Document phase" refers to, for example, metadata associated with the phase of a document to characterize the stage of development of the document. Examples of phases may include a development phase where the document's content is being outlined and organized, followed by a refinement phase, a review phase, an approval phase, and so forth. An "author role" may characterize the person performing an edit, such as a document owner, editor, reviewer, or approver. Highlighting or other means for identifying the tagged content may be used to visually identify the author responsible for the tagged content or other specified scoping criteria.

In block 108, an editing operation is presented to a user in response to a predetermined action by the user. Such an editing operation may be, for example, a "find" or a "find and replace" operation. Examples of the predetermined action may include selecting a find and replace feature in a menu using a computer pointing device, clicking-on an icon representing the find and replace feature using a computer pointing device, or a similar mechanism for selecting a feature or activating a computer application as is known in the computing arts.

In block 110, a mechanism is presented for designating a scope of tagged content by specified scoping criteria. The mechanism may include, for example, a feature that allows at least selection of one or more authors as the scope of the tagged content. The feature may further include a dialogue box that allows at least selection of one or more authors with a computer pointing device. The pointing device may be used to position a cursor and then click over the selection, which may, for example, toggle a selection of one or more authors.

Continuing to block 112 of FIG. 1B, a mechanism is presented for designating a character string, styling of characters or other features, or combination thereof.

Figure 2:
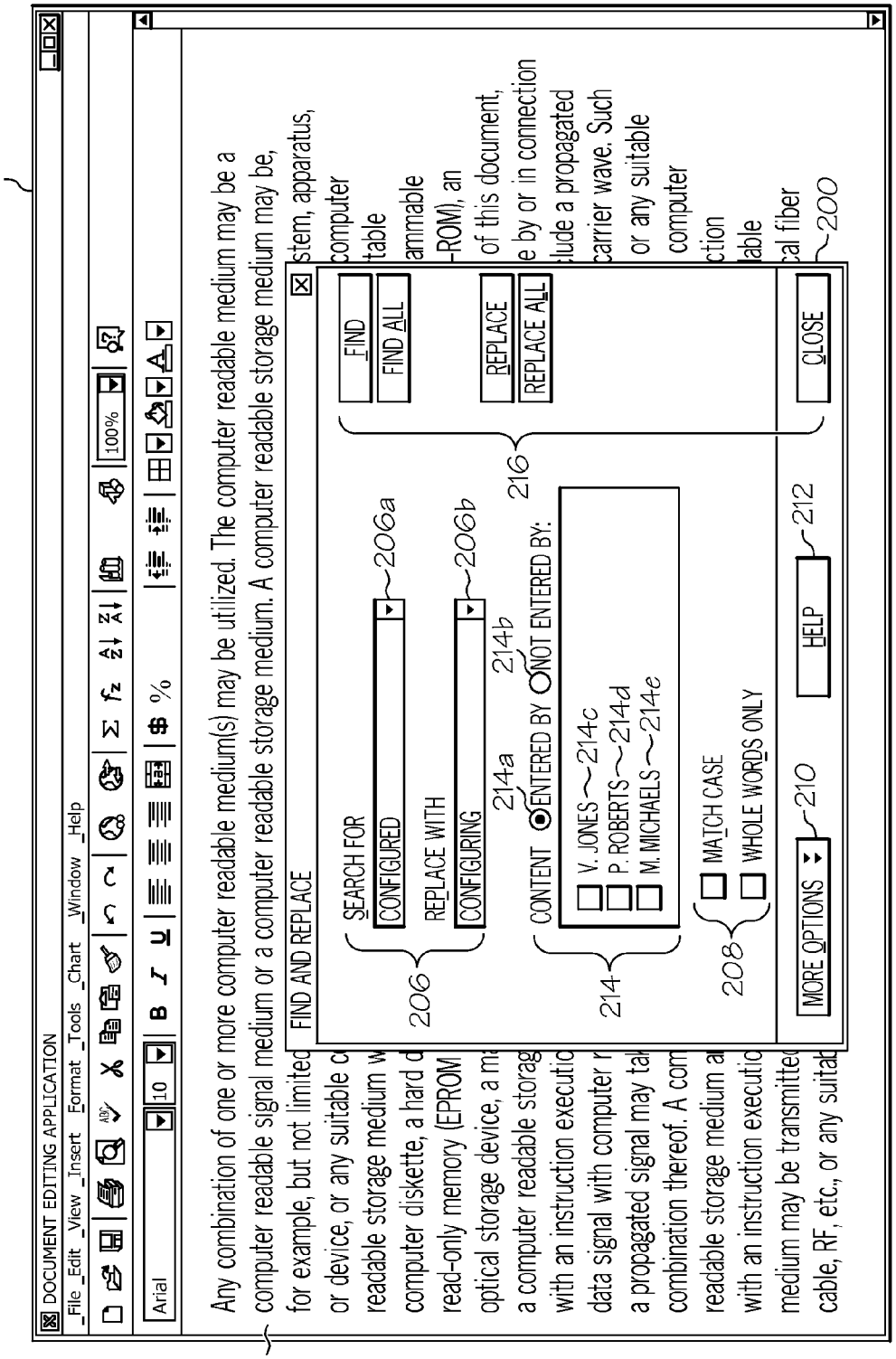
FIG. 2 is an example of a dialogue box in a document including scoping in accordance with an embodiment of the present invention.

An example of scoping in an editing context will be described in more detail below with reference to FIG. 2. Briefly, a document editing application may include features and functionality of conventional document editing applications. In the example of FIG. 2, functionality of author-specific scoping may also be integrated with editing operations such as find and replace. As described in more detail herein, a find or find and replace function interface with a user, which may, for example, be a dialogue box, may be customized to include authors or tagged content to include in scoping for the subject editing operation. Other interfaces may be implemented as alternatives to customization of the dialogue box, such as drop-down menus, tool bars, and the like.

In block 114, the editing operation may be initiated. The operation may be based on the scope of content that is tagged by specified scoping criteria and may include a designated character string, styling, or a combination of character string and styling, if any have been so designated. The operation may be initiated in response to a predetermined action by a user, which may be, for example, a click-on button that instructs the find or find and replace operation to begin.

In block 116, a selection of at least some of the tagged content may be located for editing. The selection may be made according to the designated scope of the tagged content, i.e., by the scoping set with the feature that allows at least selection of one or more specified scoping criteria, and within the scoping criteria of author identity, for example, one or more authors, plus any applicable designated character string, styling, or both.

In block 118, the selection may be edited in accordance with the requested editing operation. For example, now that the locate or find operation has been executed to identify a selection for editing, a replace operation may be performed to insert a new character string, styling, or both. If only a find operation is to be performed, editing of the selection may be manually performed.

In block 120, a determination may be made if another selection is to be located. If there is not another selection, the process ends at block 122. If there is another selection that has been located, the method 100 may return to block 118 and additional editing may be performed in accordance with the requested editing operation.

FIG. 2 is an example of a find and replace dialogue box 200 in a document editing application in accordance with an embodiment of the present invention. The dialogue box 200 in FIG. 2 is being presented in a document editing application window 202 displaying a document 204. The dialogue box may include a character string portion 206, a search options portion 208, a "more options" button 210, a "help" button 212, an author scoping portion 214, and a command button portion 216. Command buttons 216 may include "find," "find all," "replace," "replace all," and "close."

The character string portion 206 may include a "search for" box 206a for entering text to be located, and a "replace with" box 206b for text to be inserted in place of the found text. The search options portion 208 may include features for broadening or narrowing the search, such as "match case" or "whole words only." Clicking on the "more options" button 210 may provide a drop-down menu with criteria for various styling features, such as font, paragraph, and so forth.

In the author scoping portion 214, several options are offered for editing content of the document 204 based on who authored the tagged content. The author scoping portion 214 of the dialogue box 200 is customized to include the identity of the authors of tagged content in the document 204. In the example shown, a user may select from content either entered 214a or not entered 214b by authors 214c, 214d, 214e that are listed based on their identity being tagged with edited content in the document 204. In the case where a user wants to search for content edited by one or more authors and has clicked on "entered by" 214a, the boxes next to the names of each author 214c, 214d, 214e may be toggled to select the desired authors. In the case where a user wants to search for content not edited by one or more authors and has clicked on "not entered by" 214b, the boxes next to the names of each author 214c, 214d, 214e may be toggled to eliminate the desired authors from the search. Accordingly, a user may designate a scope of tagged content by either affirmatively including one or more authors or affirmatively excluding one or more authors. As an example of one default condition, if no boxes next to the authors 214c, 214d, 214e are checked, the entire document 204 would be searched.

There are numerous alternatives to configure the selections available to a user in addition to the selection configuration of FIG. 2. For example, a default condition may be established for a find and replace operation to apply only to the content that is tagged with the identity of the local user. Other authors may be offered as options to include in the scoping, similarly to FIG. 2. An option that includes the content of the entire document may be provided, as may be an option that permits selection of a box that will exclude content edited by the local user from the find and replace operation.

Another configuration may be for the default condition to be to not perform the search until a user makes a selection for the author scoping of the search. As further options for selection, the designated scope of the tagged content in the requested operation may be selected from choices including the identity of the current user of the application (which may be a default selection), the identity of one or more authors in addition to the current user, the identity of at least one author other than the user, excluding the current user, the entire document excluding the current user, and the entire document.

Though not shown in FIG. 2, in addition to or in place of the author scoping portion, scoping portions to allow selection of other specified scoping criteria, such as date of editing, date and time of editing, document phase, author role, or any combination thereof may be provided. Other criteria associated with the editing of the document where the edited content has been tagged may also be offered for selection as specified scoping criteria.

Figure 3:
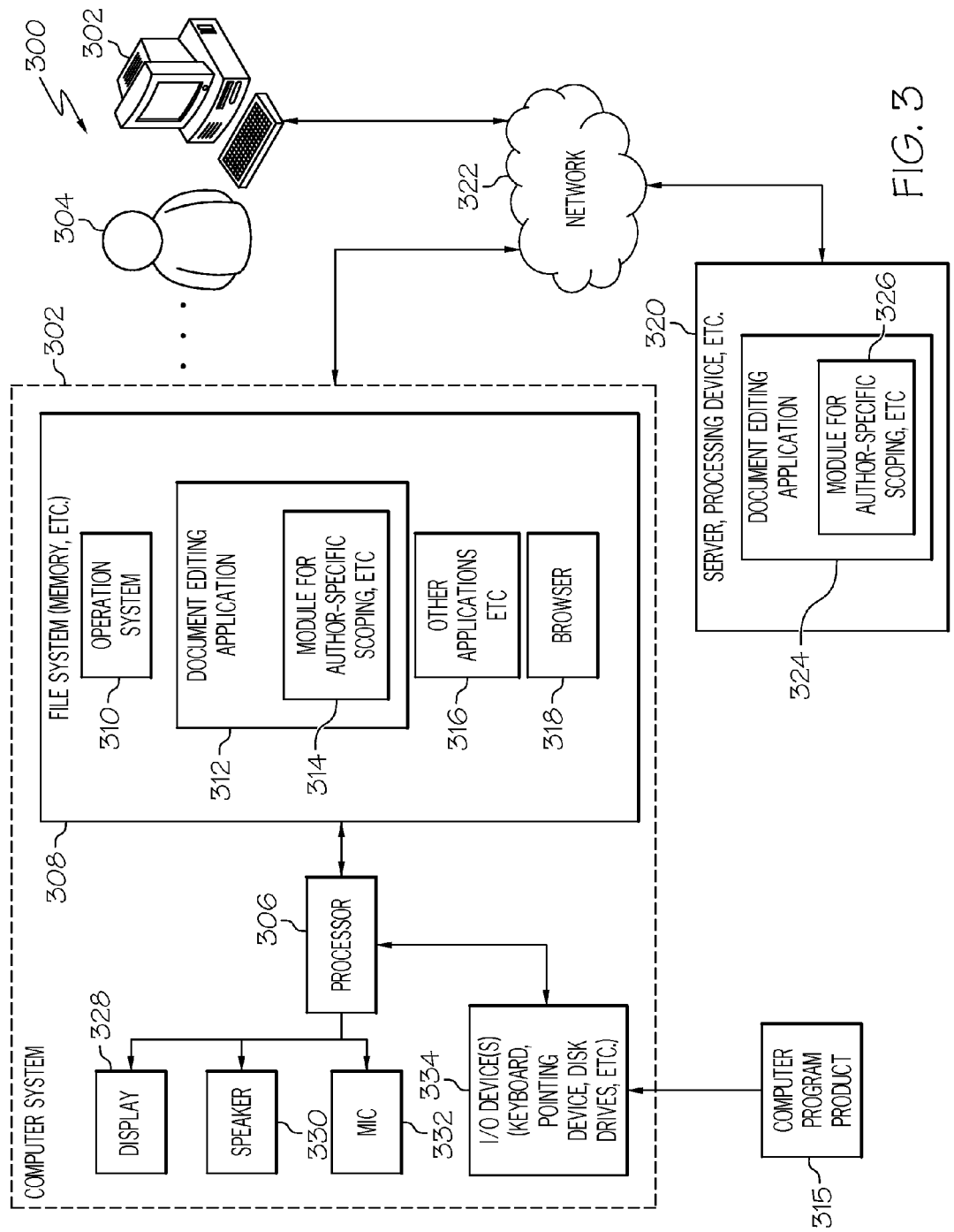
FIG. 3 is a block schematic diagram of an example of a system for providing scoping in a document editing computer application in accordance with an embodiment of the present invention.

FIG. 3 is a block schematic diagram of an example of a system 300 for providing scoping in a document editing application in accordance with an embodiment of the present invention. The methods 100 and 200 of FIGS. 1 and 2 may be embodied in or performed by the system 300. The system 300 may include a computer system 302 for use by a user 304 to implement scoping similar to that described herein. The computer system 302 may be any type of computer device or communications device including a mobile device or the like capable of performing the functions or operations described herein.

The computer system 302 may include a processor 306 to control operation of the computer system 302 and a file system 308, memory or similar data storage device. An operating system 310 may be stored on the file system 308 for running or operating on the processor 306. A document editing application 312 may also be stored on the file system and may operate on the processor 306 for creating documents similar to that described herein. A module for author-specific scoping or other specified scoping criteria 314 may be associated with the document editing application 312. The module for author-specific scoping or other specified scoping criteria 314 may be an integral part of the document editing application 312 similar to the exemplary dialogue box 200 illustrated in FIG. 2 or may be a separate module or application from the document editing application 312 that operates in coordination with the document editing application 312. The methods 100 and 200 may be embodied in the module for author-specific scoping or other specified scoping criteria 314. The module for author-specific scoping or other specified scoping criteria 314 may also be stored or embodied on computer readable storage medium or computer program product including a computer readable storage medium similar to that previously described, such as computer program product 315.

Other applications 316, software programs or the like may also be stored on the file system 308 for operation on the processor 306. A web or Internet browser 318 may also be stored on the file system 318 for accessing one or more resources, such as server 320 via a network 322. The network 322 may be the Internet, intranet or other network.

In accordance with an embodiment, the server 320 or processing device may include a document editing application 324, which may be, for example, an application that allows independent editing by multiple authors at separate times, simultaneous editing by more than one author, as in a collaborative document editing application, or both. A module for author-specific scoping or other specified scoping criteria 326 may also operate on the server 320 and may be an integral part of the document editing application 324 or may be a separate module or application. The document editing application 324 and module for author-specific scoping or other specified scoping criteria 326 on the server 320 may be provided in addition to the document editing application 312 and module for author-specific scoping or other specified scoping criteria 314 on the computer system 302.

In some embodiments, the document editing application 312 and module for author-specific scoping or other specified scoping criteria 314 on the computer system 302 may not have functionality to allow simultaneous editing by more than one author. The module for author-specific scoping or other specified scoping criteria 314 does not require a network to be implemented. For example, multiple authors could share a file stored on a USB key, and with the module for author-specific scoping or other specified scoping criteria 314 could conduct scoped searches by specified scoping criteria, using the inserted tags. Further, the module 314 may be used in a networked system for off-line editing by a single author, for example, if a document created with document editing application 324 is checked out for editing during a period when a user will experience a temporary period without access to the network 322. In another embodiment, only the document editing application 324 and module for author-specific scoping or other specified scoping criteria 326 on the server 320 may be provided, such as in a cloud computing environment or similar arrangement. The document editing application 324 and module for author-specific scoping or other specified scoping criteria 326 would then be accessed via the network 322 using the computer system or computing device 302.

The computer system 302 may also include a display 328 for presenting the document being edited 202 and operation dialogue box 200 similar to those shown in FIG. 2. The computer system 302 may also include a speaker system 330 for presenting any audio content that may be part of any presentation. The computer system 302 may additionally include a microphone 332 for the user 304 to aurally communicate via the computer system 302.

The computer system 302 may further include one or more input devices, output devices or combination input/output devices, collectively I/O devices 334. The I/O devices 334 may include a keyboard, pointing device, such as a mouse or other computer pointing device, disk drives and any other devices to permit a user, such as user 304, to interface with and control operation of the computer system 302 and network resources, such as server 320. The module for author-specific scoping 314 may be loaded on the computer system 302 from a computer program product, such as computer program product 315 using one of the input devices 334.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for scoping editing operations in a document using a document editing computer application, the method comprising:
   tagging each incidence of edited content of the document with an identity of an author responsible for an applicable incidence, a date of the applicable incidence, a time of day of the applicable incidence, a document phase, and an author role;
   presenting a mechanism for designating a scope of tagged edited content to be found, wherein the mechanism comprises features for respectively designating the author or authors, the date, the time of day, the document phase, the author role, a character string, styling of characters, or any combination thereof, wherein such presenting a mechanism for designating a scope of tagged edited content comprises presenting a mechanism for receiving from a user a selection that the user wants to search for content not edited by one or more authors and the affirmative exclusion by a user of one or more authors by selecting the one or more authors to exclude the one or more authors;
   finding a selection of at least some of the tagged edited content according to the designated scope of the tagged edited content and the designated character string, styling, or combination thereof; and
   replacing the designated character string, styling, or combination thereof within the designated scope of tagged edited content in the document.

2. The method of claim 1, further comprising editing the document in accordance with a requested operation.

3. The method of claim 1, wherein the designated scope of the tagged edited content in the requested operation comprises the identity of the current user of the application.

4. The method of claim 3, wherein the designated scope of the tagged edited content further comprises the identity of one or more authors in addition to the current user.

5. The method of claim 1, wherein the designated scope of the tagged edited content comprises the identity of at least one author other than the user, and excludes the current user.

6. The method of claim 1, wherein the designated scope of the tagged edited content comprises the entire document, excluding the current user.

7. The method of claim 1, wherein presenting a mechanism for designating a scope of the tagged edited content further comprises presenting a mechanism for receiving from a user a selection that the user wants to search for content edited by one or more authors and the affirmative inclusion by a user of one or more authors by selecting the one or more authors to include the one or more authors.

8. The method of claim 1, wherein presenting a mechanism for designating a scope of tagged edited content by author comprises presenting a feature allowing at least selection of one or more authors as the scope of the tagged edited content.

9. The method of claim 8, wherein the feature comprises a dialogue box allowing at least selection of one or more authors with a computer pointing device.

10. The method of claim 1, further comprising highlighting or otherwise visually identifying the tagged edited content to identify the author responsible for the tagged content.

11. The method of claim 1, wherein tagging each incidence of edited content of the document with a documents phase comprises tagging each incidence of edited content with a stage of development of the document, the stage of development of the document comprising one of an outlined and organized documents phase, a refinement document phase, a review phase and an approval phase.

12. The method of claim 1, wherein tagging each incidence of edited content of the documents with an author role comprising tagging each incidence of edited content with one of group of author roles comprising owner, editor, reviewer and approver.

13. The method of claim 1, wherein designating the styling of characters comprises selecting at least a font.

14. A system for providing scoping of editing operations in a document using a document editing computer application, the system comprising:
   a processor;
   a module, operating on the processor, for providing scoping of editing operations in a document using a document editing computer application, the module comprising:
      a module for tagging each incidence of edited content of the document an identity of an author responsible for an applicable incidence, a date of the applicable incidence, a time of day of the applicable incidence, a document phase, and an author role;
      a module for presenting a mechanism for designating a scope of tagged edited content to be found, wherein the mechanism comprises features for respectively designating the author or authors, the date, the time of day, the document phase, the author role, a character string, styling of characters, or any combination thereof, wherein such module for presenting a mechanism for designating a scope of tagged edited content comprises a module for presenting a mechanism for receiving from a user a selection that the user wants to search for content not edited by one or more authors and the affirmative exclusion by a user of one or more authors by selecting the one or more authors to exclude the one or more authors;
      a module for finding a selection of at least some of the tagged edited content according to the designated scope of the tagged edited content and the designated character string, styling, or combination thereof; and
      a module for replacing the designated character string, styling, or combination thereof within the designated scope of tagged edited content in the document.

15. The system of claim 14, wherein a module for presenting a mechanism for designating a scope of the tagged content further comprises a module for presenting a mechanism for receiving from a user a selection that the user wants to search for content edited by one or more authors and the affirmative inclusion by a user of one or more authors by selecting the one or more authors to include the one or more authors.

16. A computer program product for providing scoping of editing operations in a document using a document editing computer application, the computer program product comprising:
- a non-transitory computer readable storage medium having computer readable program code embodied therewith, the computer readable program code comprising;
- computer readable program code configured to tag each incidence of edited content of the document with an identity of an author responsible for an applicable incidence, a date of the applicable incidence, a time of day of the applicable incidence, a document phase, and an author role;
- computer readable program code configured to present a mechanism for designating a scope of tagged edited content to be found, wherein the mechanism comprises features for respectively designating the author or authors, the date, the time of day, the document phase, the author role, a character string, styling of characters, or any combination thereof, wherein the computer readable program code configured to present a mechanism for designating a scope of tagged edited content comprises computer readable program code configured to present a mechanism for receiving from a user a selection that the user wants to search for content not edited by one or more authors and the affirmative exclusion by a user of one or more authors by selecting the one or more authors to exclude the one or more authors; and
- computer readable program code configured to find a selection of at least some of the tagged edited content according to the designated scope of the tagged edited content and the designated character string, styling, or combination thereof; and
- computer readable program code configured to replace the designated character string, styling, or combination thereof within the designated scope of tagged edited content in the document.

17. The computer program product of claim 16, wherein computer readable program code configured to present a mechanism for designating a scope of the tagged content further comprises computer readable program code configured to present a mechanism for receiving from a user a selection that the user wants to search for content edited by one or more authors and the affirmative inclusion by a user of one or more authors by selecting the one or more authors to include the one or more authors.

* * * * *